United States Patent
Brown et al.

(10) Patent No.: US 6,442,558 B1
(45) Date of Patent: Aug. 27, 2002

(54) MECHANISMS FOR DIVISION, STORAGE, RECONSTRUCTION, GENERATION, AND DELIVERY OF JAVA CLASS FILES

(75) Inventors: Michael Wayne Brown, Georgetown; Joseph Herbert McIntyre; Scott Lee Winters, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,921

(22) Filed: Dec. 3, 1998

(51) Int. Cl.[7] .............................. G06F 7/00; G06F 17/00
(52) U.S. Cl. ...................... 707/102; 707/10; 707/104.1; 709/217; 709/218; 717/5; 717/9
(58) Field of Search ................................. 707/103, 702, 707/102; 717/2, 4, 5, 9; 395/704, 705, 709

(56) References Cited

U.S. PATENT DOCUMENTS

| 5,905,895 A | * | 5/1999 | Halter | 395/709 |
| 5,920,720 A | * | 7/1999 | Toutonghi et al. | 395/705 |
| 6,026,237 A | * | 2/2000 | Berry et al. | 395/704 |
| 6,118,940 A | * | 9/2000 | Alexander, III et al. | 395/704 |
| 6,131,187 A | * | 10/2000 | Chow et al. | 717/5 |

FOREIGN PATENT DOCUMENTS

| GB | 2308906 | 7/1997 | G06F/9/45 |
| GB | 2331814 | 6/1999 | G06F/9/445 |
| GB | 2341462 | 3/2000 | G06F/9/44 |

OTHER PUBLICATIONS

Java Bytecode to Native Code Translation: The Caffeine Prototype & Preliminary Results. Hsieh et al. IEEE, pp. 90–97, 1996.*
Optimizing Net Compiler for Improved Java Performance. Hsieh et al., IEEE pp. 67–75, 1997.*
Briki: Optimizing Java Compiler. Li et al., IEEE pp. 179–184, 1997.*
Reducing Transfer Delay Using Java Class File Splitting and Prefetching; Krintz et al., Oct. 1999.
Reducing Transfer Delay Using Java Class File Splitting and Prefetching; Krintz et al.; 1999; pp. 276–291.

* cited by examiner

Primary Examiner—Diane D. Mizrahi
Assistant Examiner—Jacques Veillard
(74) Attorney, Agent, or Firm—Duke W. Yee; Jeffrey S. LaBaw (57) ABSTRACT

A method and apparatus in a distributed data processing system for processing class files. A first data structure is received at a server. The first data structure includes a plurality of bytecodes and optimized content. A set of elements is identified in the optimized content. The set of elements is stored. Responsive to a request from a client, a second data structure is created. This second data structure includes the plurality of bytecodes and an element from the set of elements.

20 Claims, 6 Drawing Sheets

MECHANISMS FOR DIVISION, STORAGE, RECONSTRUCTION, GENERATION, AND DELIVERY OF JAVA CLASS FILES

BACKGROUND OF THE INVENTION

1. Technical Field

The present invention relates generally to an improved data processing system and in particular to an improved method and apparatus for optimizing transfer of code to a data processing system. Still more particularly, the present invention relates to an improved method and apparatus for creating and sending class files to a data processing system in which the class files are optimized for the data processing system.

2. Description of Related Art

Internet, also referred to as an "internetwork", in communications is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

Currently, the most commonly employed method of transferring data over the Internet is to employ the World Wide Web environment, also called simply "the web". Other Internet resources exist for transferring information, such as File Transfer Protocol (FTP) and Gopher, but have not achieved the popularity of the web. In the web environment, servers and clients effect data transaction using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other web resources identified by a Uniform Resource Locator (URL). A URL is a special syntax identifier defining a communications path to specific information. Each logical block of information accessible to a client, called a "page" or a "web page", is identified by a URL. The URL provides a universal, consistent method for finding and accessing this information by the web "browser". A browser is a program capable of submitting a request for information identified by a URL at the client machine. Retrieval of information on the web is generally accomplished with an HTML-compatible browser. When a user desires to retrieve a page, a request is submitted to a server connected to a client computer at which the user is located and may be handled by a series of servers to effect retrieval of the requested information. The information is provided to the client formatted according to HTML. Typically, personal computers (PCs) along with workstations are typically used to access the Internet.

Often applications or programs may be sent to a computer from a web server across the Internet. Java applications are becoming increasingly more prevalent as the type of application sent between web servers and client computers. Java applications are common on the Internet and becoming more increasingly common in intranets and in other types of networks used in businesses.

Java is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods.

The Java virtual machine (JVM) is a virtual computer component that resides only in memory. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are non-specific to a particular computer architecture. A bytecode is a machine independent code generated by the Java compiler and executed by a Java interpreter. A Java interpreter is a part in the JVM that alternately decodes and interprets a bytecode or bytecodes. These bytecode instructions are designed to be easy to interpret on any computer and easily translated on the fly into native machine code. In a networked environment, different versions of class files may be stored on a server for delivery to various clients in the networked environment. In many cases, optimizations to class files may be available depending on the client machine on which the class file will be loaded. However, these optimizations are usually restricted to a particular set of hardware, operating system and/or Java virtual machine.

Therefore, it would be advantageous to have an improved method and apparatus for managing class files, and categorizing optimized versions of class file content, in a networked environment.

SUMMARY OF THE INVENTION

The present mechanism provides a method and apparatus in a distributed data processing system for processing class files. A first data structure is received at a server. The first data structure includes a plurality of bytecodes and optimized content. A set of elements is identified in the optimized content. The set of elements is stored. Responsive to a request from a client, a second data structure is created. This second data structure includes the plurality of bytecodes and an element from the set of elements.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
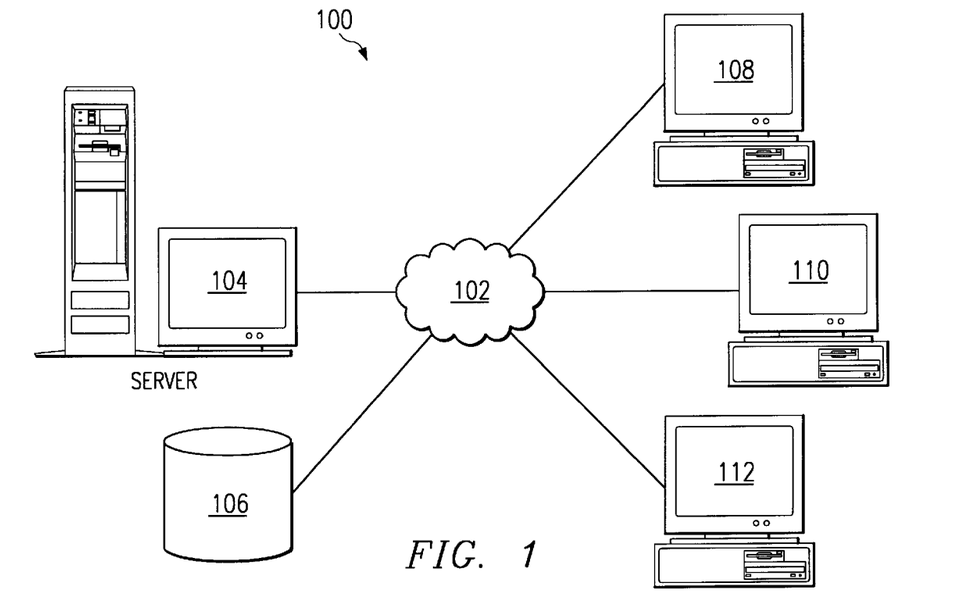
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, network computers (NCs) 108, 110, and 112 also are connected to a network 102. For purposes of this application, a network computer is any computer, coupled to a network, which receives a program or other application from another computer coupled to the network. In the depicted example, server 104 provides data, such as boot files, operating system images, and applications to NCs 108–112. NCs 108, 110, and 112 are clients to server 104. Distributed data processing system 100 may include additional servers, NCs, and other devices not shown. FIG. 1 is intended as an example, and not as an architectural limitation for the processes of the present invention.

Figure 2:
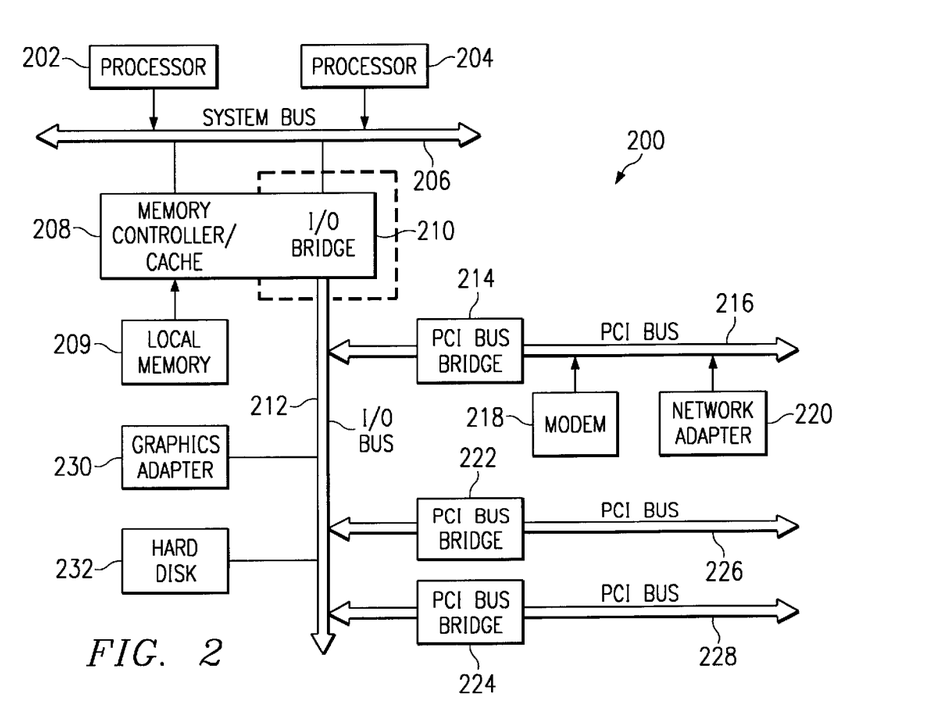
FIG. 2 is a block diagram of a data processing system which may be implemented as a server in accordance with the present invention.

Referring to FIG. 2, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
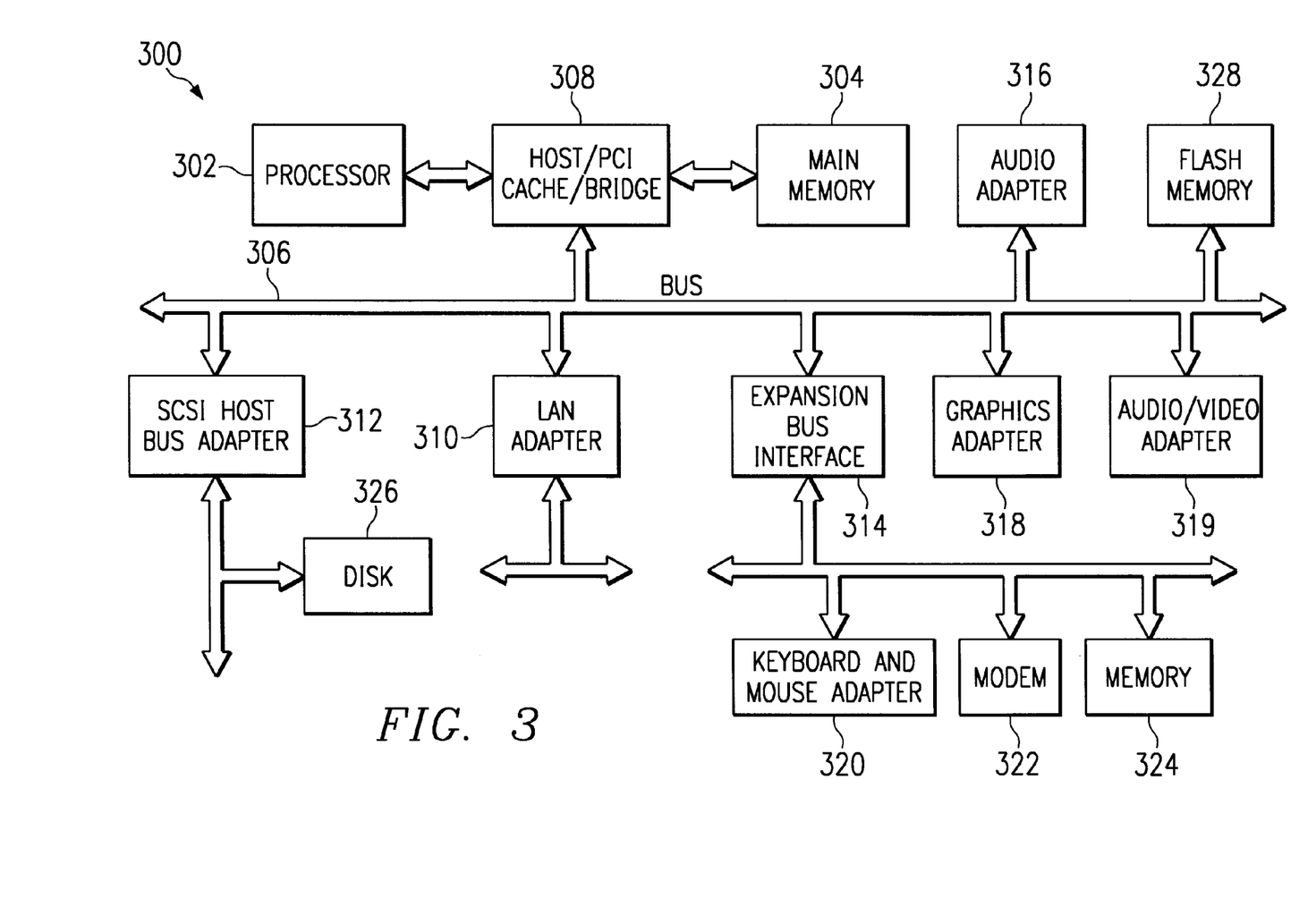
FIG. 3 is a block diagram of a data processing system which may be implemented as a network computer in accordance with a preferred embodiment of the present invention.

With reference now to FIG. 3, a block diagram of a data processing system 300 which may be implemented as a client computer is illustrated in accordance with a preferred embodiment of the present invention. In the depicted example, data processing system 300 is a network computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for a hard disk drive 326 in the depicted example. A flash memory 328 also is connected to PCI local bus 306 to provide additional storage for data processing system 300. Typical PCI local bus implementations will support three or four PCI expansion slots or add-in connectors. Those of ordinary skill in the art will appreciate that the hardware in FIG. 3 may vary. For example, other peripheral devices, such as optical disk drives and the like may be used in addition to or in place of the hardware depicted in FIG. 3. In addition, if the client computer is a personal computer instead of a network computer, storage devices, such as, a tape drive, and a CD-ROM typically may be included within data processing system 300. The depicted example is not meant to imply architectural limitations with respect to the present invention.

The present invention provides a method, apparatus, and instructions for managing class files. The processes of the present invention provide for the storage of class files and related optimized content. The present invention provides discrete elements that are suitable for use by a server to create a custom class file for a client. The class file may be customized for a client in a variety of ways. For example, the class file may be created such that optimized content is present for a particular platform. This optimized content may include platform specific code, preformatted data, or virtual machine information.

Figure 4:
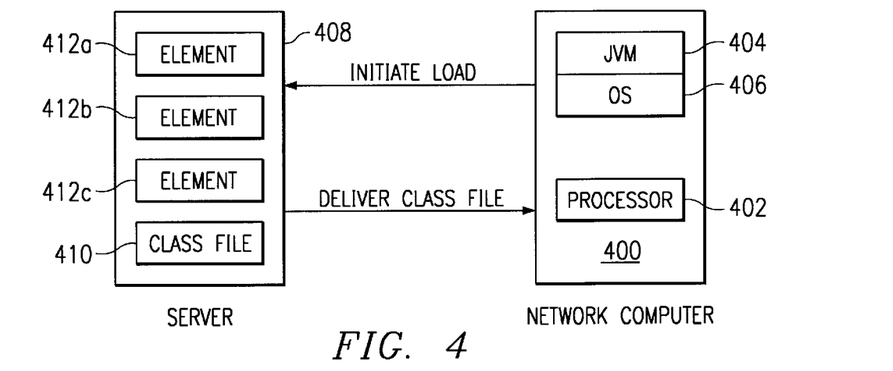
FIG. 4 is a diagram illustrating loading of a class file in accordance with a preferred embodiment of the present invention.

Turning now to FIG. 4, a diagram illustrating loading of a class file is depicted in accordance with a preferred embodiment of the present invention. Network computer 400 in FIG. 4 includes a processor 402, which executes Java Virtual Machine (JVM) 404 and operating system (OS) 406. Server 408 includes class files 410 and elements 412a–412c. In the depicted example, network computer 400 sends a request to server 408 to initiate loading of a class. In response, a class file from class files 410 is delivered to network computer 400.

According to the present invention, class files 410 include fully caffienated class files (FCCFs). These FCCFs contain bytecodes as normal class files, which allows existing JVMs to use these FCCFs. In addition, FCCFs include optimized content, such as data, native code, or pointers to optimized content for the network computer. In accordance with a preferred embodiment of the present invention, the optimized content for the class file is selected from elements 412a–412c. A particular element selected for use in the class file may be based on the particular platform of the client requesting the class file. Although only three elements are shown in FIG. 4, other numbers of elements may be used in selecting optimized content for a class file. In addition, a class file may be created from multiple sets of elements. An enhanced JVM is able to recognize and use optimized content contained within FCCFs. More information on FCCFs and their use may be found in Method and Apparatus For Optimizing Execution of Java Programs, U.S. application Ser. No. 09/126,282, filed Jul. 30, 1998, now U.S. Pat. No. 6,324,688 and in Method and Apparatus For Loading Native Object Code in Data Processing System, U.S. application Ser. No. 09/126,283, filed Jul. 30, 1998, now U.S. Pat. No. 6,295,638 both assigned to the same assignee and both incorporated herein by reference.

Figure 5:
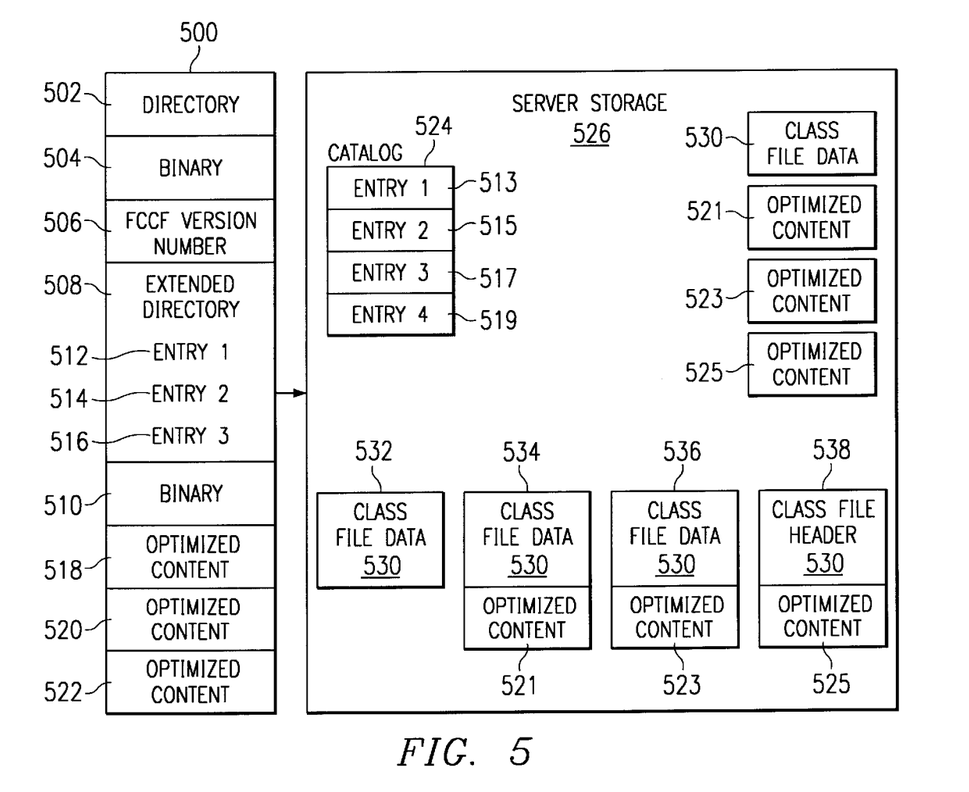
FIG. 5 is a diagram of a fully caffienated class file (FCCF) being stored on a server in accordance with a preferred embodiment of the present invention.

With reference now to FIG. 5, a diagram of a fully caffienated class file (FCCF) and the processing of a FCCF is depicted in accordance with a preferred embodiment of the present invention. FCCF 500 includes a directory 502 and binary 504, which are normally found in a standard Java class file. In addition, a FCCF version number 506, an extended directory 508, and binary 510 are found in FCCF 500.

Directory 502 and binary 504 are standard Java class file entries. Binary 504 is a binary stream of data containing class file data including bytecodes. A JVM that is unable to recognize additional FCCF information will ignore FCCF version number 506, extended directory 508, and binary 510. A standard JVM will be able to read the content within binary 504 using directory 502 and process FCCF 500 as a regular Java class file.

On the other hand, a JVM that is able to process these additional sections will process extended directory 508 to gain entry to binary 510, which is a binary stream of data that contains optimized content. This optimized content may include, for example, preformatted data or optimized content for a platform. In the depicted example, an extended directory 508, also referred to as a table of contents, includes a number of entries.

Extended directory 508 includes entry 1 512, entry 2 514, and entry 3 516. These entries point to optimized content 518, optimized content 520, and optimized content 522, respectively within binary 510. In accordance with a preferred embodiment of the present invention, FCCF 500 may be processed to identify elements for use in creating custom class files. In processing FCCF 500, a catalog 524 is updated within server storage 526. Catalog 524 contains information that is used to identify elements. In the depicted example, catalog 524 includes entry 1 513, entry 2 515, entry 3 517, and entry 4 519. Class file data 530 from binaries 502 and 504 is stored in server storage 526. Class file data 530 includes the file header information, the class definition, and the Java bytecodes corresponding to the class. Optimized content 518, optimized content 520, and optimized content 522 are stored within server storage 526 as optimized content 521, optimized content 523, and optimized content 525, respectively. When a client requests a class file, a customized class file may be created from these elements and returned to the client.

In the depicted example, if the client is unknown, or there is no optimized content associated with the client, a class file 532 containing class file data 530 is created and returned to the client. If a client requesting a class file fits criteria for entry 1 513 in catalog 524, class file 534 will be returned to the client. In this example, class file 534 is a FCCF class file, like FCCF 500 and includes both class file data 530 and optimized content 521. If a client requesting a class file fits the criteria in entry 2 515, a class file 536 is created including class file data 530 and optimized content 523. Class file 538 is created when a client fits the criteria for entry 3 517. In this example, all of class file data 530 is replaced with optimized content 532. As a result class file 538 only contains optimized content 525 and class file header information 532 derived from class file data 530. Other portions of class files 532, 534, 536, and 538 are not shown to more clearly describe the features of the present invention. In the depicted example, an FCCF created for a particular client includes only a single physical directory to the optimized content since the FCCF is created based upon the characteristics of a particular client.

FCCF's are example of data structures that may be used in providing customized content to clients. Other types of data structures may be used to deliver optimized content.

Figure 6:
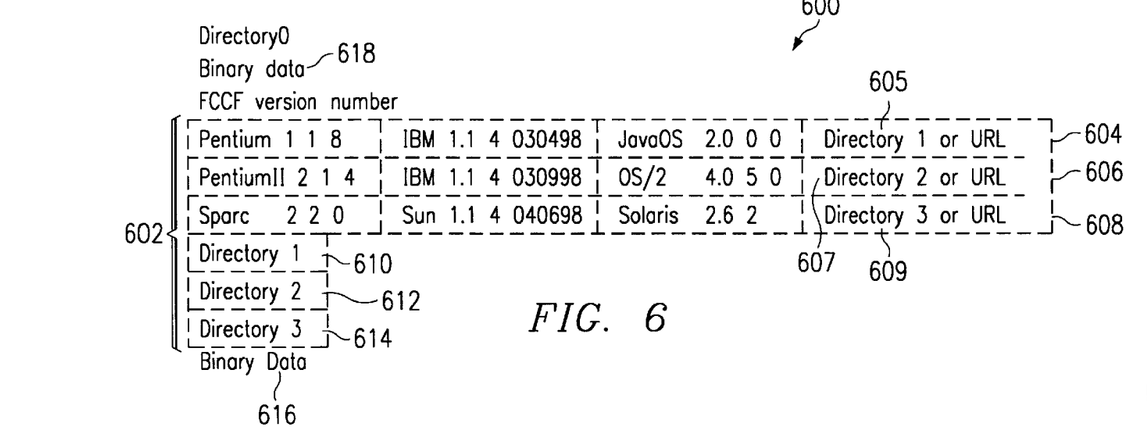
FIG. 6 is an example of a FCCF in accordance with a preferred embodiment of the present invention.

With reference now to FIG. 6, an example of a FCCF is depicted in accordance with a preferred embodiment of the present invention. FCCF 600 illustrates examples of content within an extended directory 602. Platform criteria is found within entries 604, 606, and 608 within extended directory 602. In the depicted FCCF, the criteria used in the entries are the processor type, the JVM, and the operating system. For example, in entry 604, the platform criteria is as follows: Processor PentiumII 2 1 4, JVM IBM 1.1.4 030998, and operating system OS/2 4.0 5 0. Each entry also includes a pointer to a directory or URL associated with the platform criteria. For example, entry 604 includes a pointer to directory 610, entry 606 contains a pointer to directory 612, and entry 608 includes a pointer to directory 614. The relationship of each pointer, 605, 607, and 609, to its directory is a logical relationship. Physical directories 610, 612, and 614, may reside within the FCCF file or may be accessible as an external resource. The directory also could point to bytecodes within binary data 618 in FCCF 600.

In processing FCCF 600, entries 604, 606, and 608 are used to create catalog entries for a catalog in a server, such as catalog 524 in FIG. 5. Directories 610, 612, and 614, depending upon the implementation, contain internal file pointers that point to optimized content or data, such as binary data 616. Alternatively, the pointer may reference an external resource, such as, for example, optimized content 412 in server 408 in FIG. 4. The criteria and pointers may be used to provide optimized code for different types of processors. Alternatively, the criteria and pointers may be used to provide optimized code for other platform criteria, such as the operating system or Java virtual machine used on the platform.

Figure 7:
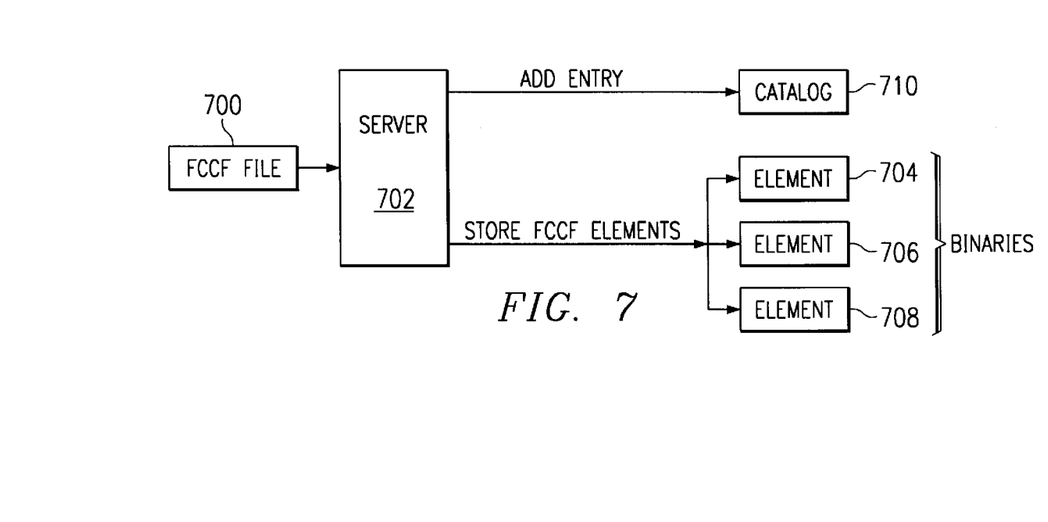
FIG. 7 is an illustration of a storage operation for a FCCF is depicted in accordance with a preferred embodiment of the present invention.

Turning next to FIG. 7, an illustration of a storage operation for a FCCF is depicted in accordance with a preferred embodiment of the present invention. In the depicted example, FCCF file 700 is received by server process 702, which breaks down content within the FCCF file into elements 704, 706,and 708, which are stored within the server. In addition, server process 702 updates a catalog 710, which is used to access elements 704, 706, and 708 when creating a custom class file. Catalog 710 may take various forms depending on the implementation. For example, catalog 710 may include entries for various platforms, which in turn point to different elements stored within the server. In this manner, when a client of a particular platform requests a class file, the platform type may be used to select a particular element for use in the class file that is to be returned to the client.

Figure 8:
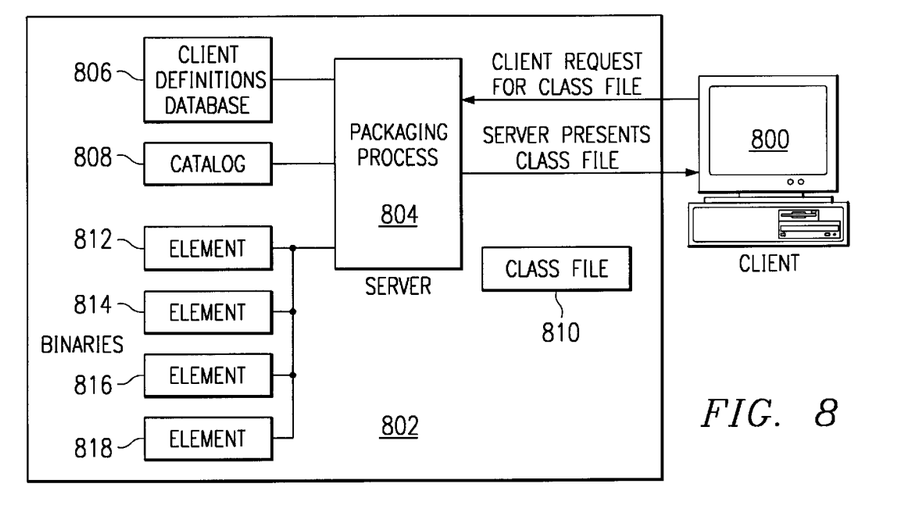
FIG. 8 is a diagram depicting construction of a class file is shown in accordance with a preferred embodiment of the present invention.

With reference now to FIG. 8, a diagram depicting construction of a class file is shown in accordance with a preferred embodiment of the present invention. In this example, client 800 requests a class file from server 802. This request is received by a packaging process 804 within server 802. Packaging process 804 takes the request and uses client definitions 806 and catalog 808 to construct a class file 810 from elements 812, 814, 816, and/or 818. Cllass file 810 is then presented or returned to client 800.

A determination is made as to whether a client definition is present in a client definitions database 806 for client 800. If a client definition is present it is used to select, an entry in catalog 808. The client definitions database is part of a server management function that provides a service through which a server application can request information on an attached client computer. This information may include client hardware, operating system, and client application information. The information required to satisfy the needs of an implementation of the present invention are defined by the content requirements of the catalog that is referenced to find the suitable optimized content for a particular client. For instance, the server facility may provide processor, operating system, and Java virtual machine information corresponding to an implementation of the FCCF, allowing the catalog to use the same criteria to find appropriate content.

The catalog entry directs the packaging process to select one or more elements to package in class file 810 and return to client 800. Although the depicted example illustrates the selection of a single element for placement in a class file, multiple elements may be selected for use in a class file. For example, element 812 and element 814 may be in one set of elements while element 816 and element 818 may be in another set of elements from which one element is selected from each set for placement in class file 810.

Figure 9:
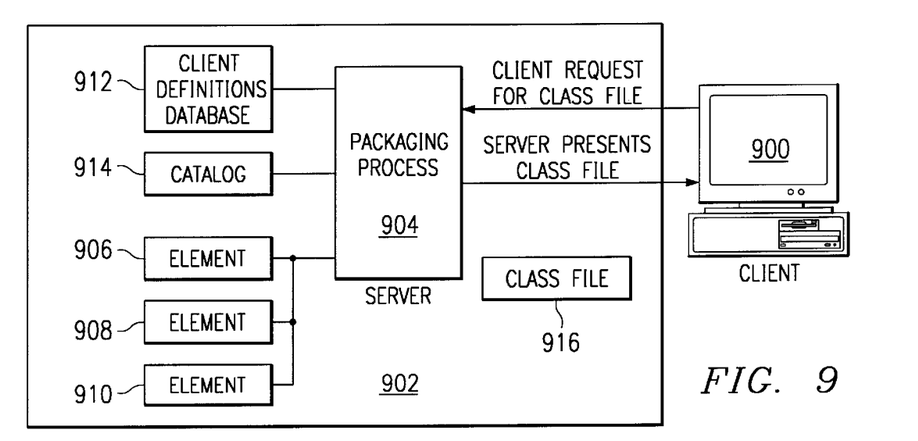
FIG. 9 is a diagram illustrating generation of a class file is depicted in accordance with a preferred embodiment of the present invention.

Turning next to FIG. 9, a diagram illustrating the delivery of a class file that is generated by the server is depicted in accordance with a preferred embodiment of the present invention. In this example, client 900 requests a class file from server 902. The request is processed by packaging process 904 in server 902. In the depicted example, elements 906, 908, and 910 may be class files, but with no optimized content for a particular client. Packaging process 904 accesses client definition database 912 and catalog 914 in the same manner as depicted in FIG. 8. However, whereas the process in FIG. 8 provided the ability to construct the delivered class file, the process in FIG. 9 provides additional capability to apply server processing in the creation of class file 916 to be delivered.

Packaging process 904 may find information from client definition database 912 that allows packaging process 904 to find the Java class file, but no optimized content for the particular client. The server may retrieve the Java class file, then execute an optimizing function to create optimized content. This content may be delivered in a FCCF file in accordance with a preferred embodiment of the present invention. In this instance, class file 916 is returned as a FCCF file.

If no optimizing function exists for the particular client platform, then class file 916 is returned to client 900. Class file 916 in this instance will be a class file with no additional information.

Figure 10:
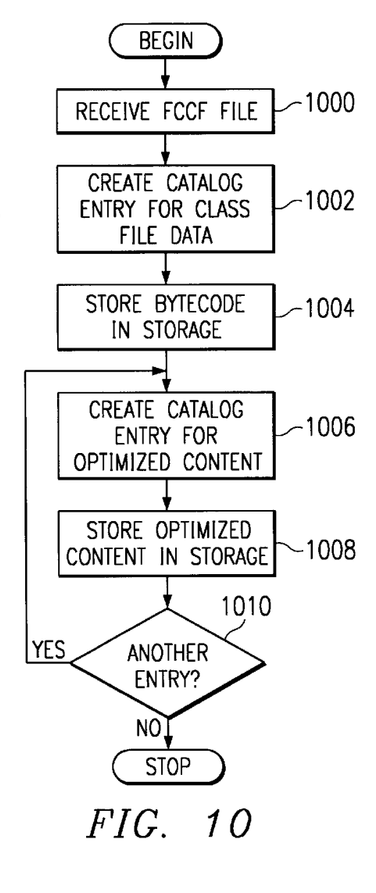
FIG. 10 is a flowchart of the process for storing elements is depicted in accordance with a preferred embodiment of the present invention.

Turning now to FIG. 10, a flowchart of the process for storing elements is depicted in accordance with a preferred embodiment of the present invention. This process is run on a server in the depicted examples. The process begins by receiving a FCCF file (step 1000) thereafter, a catalog entry for class file data is created (step 1002), and the class file data is stored (step 1004). The class file data entry is placed in the catalog so that the class file data may be retrieved for use in creating a customized class file. This class file data may be one element placed in a class file when creating a class file for a client.

Next, a catalog entry is created for the optimized content (step 1006) then, the optimized content is stored (step 1008). A determination is then made as to whether another entry is present in the extended directory (step 1010). If another entry is present, the process returns to steps 1006 and 1008 to create a catalog entry for this optimized content and to store the optimized content. Otherwise, the process terminates.

Figure 11:
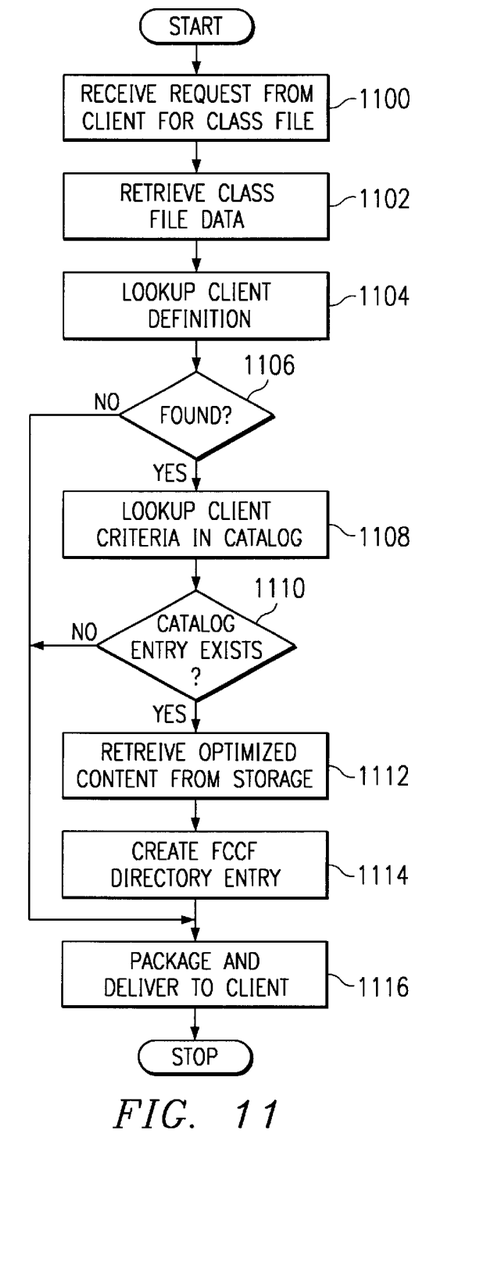
FIG. 11 is a flowchart of a process for constructing a class file is depicted in accordance with a preferred embodiment of the present invention.

With reference next to FIG. 11, a flowchart of a process for creating a class file is depicted in accordance with a preferred embodiment of the present invention. The process begins by receiving a client request for a class file (step 1100). Next, the process retrieves the class file data from the storage (step 1102). A client definition is looked up based on the request (step 1104). This definition is made available to server applications through an interface to the server management software that stores information about computers within a network. If the client definition is found for the client requesting the class file (step 1106), client criteria is looked up in the catalog (step 1108). A determination is then made as to whether a catalog entry exists for this client definition (step 1110). If a catalog entry does exist, the optimized content pointed to by the catalog entry is retrieved from storage (step 1112). Next, a FCCF directory entry is created (step 1114). The code retrieved from storage is packaged and delivered to the client (step 1116) with the process terminating thereafter. In the depicted example, the code is packaged in a class file that is sent to the client. The packaging of the content in step 1116 involves creating a plain Java class file if no optimized content is available or creating a FCCF file if optimized content is available.

With reference again to step 1110, if a catalog entry is not present for the client, it then proceeds to packaging step 1116. With reference again to step 1106, if the client definition is not found, the process also proceeds to step 1116 as described above.

Figure 12:
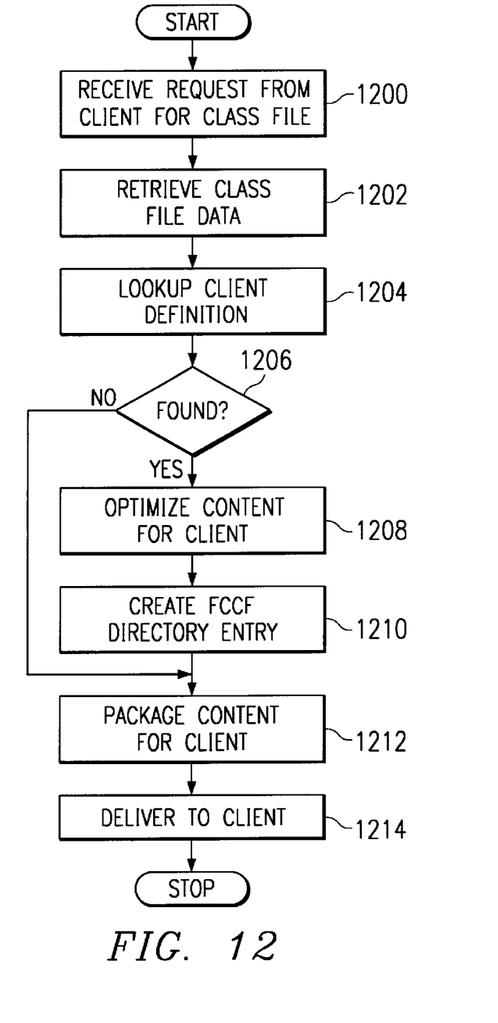
FIG. 12 is a flowchart of a process for generating class files is depicted in accordance with a preferred embodiment of the present invention.

Turning to FIG. 12, a flowchart of a process for constructing class files is depicted in accordance with a preferred embodiment of the present invention. The process begins by receiving a request from a client for a class file (step 1200). Next, the Java class data is retrieved (step 1202). This content includes bytecodes. Then, a lookup is performed for the client definition (step 1204). A determination is made as to whether a client definition has been found for the client (step 1206). If a client definition has been found, the optimizing function is executed to create content for the client (step 1208). A FCCF directory entry is created for the optimized content (step 1210). The content is then packaged for the client (step 1212), and the class file is delivered to the client (step 1214) with the process terminating thereafter. The packaging of the content in step 1212 involves creating a plain Java class file if no optimized content is available or creating a FCCF file if optimized content is available. With reference again to step 1206, if a class definition has not been found for the client, then the retrieved general content is packaged in step 1212 and the class file delivered in step 1214.

Thus, the present invention provides a method and apparatus to provide customized class files and optimized content to clients without having to maintain multiple versions of class files and optimized content. The customization is provided through separating class files and optimized content into discrete elements and using these elements to create class files and optimized content to create customized class files and optimized content for each client.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a distributed data processing system for creating class files, the method comprising the data processing system implemented steps of:

receiving a first data structure at a server, wherein the first data structure includes a plurality of bytecodes and optimized content;

identifying a set of elements in the optimized content;

storing the set of elements; and responsive to a request from a client, creating a second data structure, wherein the second data structure includes the plurality of bytecodes and an element from the set of elements.

2. The method of claim 1, wherein the first data structure further includes:

a first directory, wherein the directory points to the plurality of bytecodes; and a second directory including a plurality of criteria associated with a plurality of pointers, wherein each pointer points to an element within the set of elements in the optimized content.

3. A method in a distributed data processing system for creating class files, the method comprising the data processing system implemented steps of:

receiving a first data structure at a server, wherein the first data structure includes a plurality of bytecodes and optimized content and wherein the first data structure is a fully caffeinated class file;

identifying a set of elements in the optimized content;

storing the set of elements; and responsive to a request from a client, creating a second data structure, wherein the second data structure includes the plurality of bytecodes and an element from the set of elements.

4. A method in a distributed data processing system for creating class files, the method comprising the data processing system implemented steps of:

receiving a first data structure at a server, wherein the first data structure includes a plurality of bytecodes and optimized content;

identifying a set of elements in the optimized content;

storing the set of elements; and responsive to a request from a client, creating a second data structure, wherein the second data structure includes the plurality of bytecodes and an element from the set of elements and wherein the second data structure is a fully caffeinated class file.

5. A method in a data processing system for processing class files, the method comprising the data processing system implemented steps of:

identifying a set of elements for use in a class file, wherein each element in the set of elements is associated with a particular type of data processing system;

receiving a request for the class file from a data processing system, wherein the data processing system has a type;

creating the class file based on the type of the data processing system requesting the class file; and sending the class file to the data processing system.

6. The method of claim 5, wherein each element within the plurality of elements is optimized code for the particular type of data processing system associated with the element.

7. The method of claim 5, wherein the class file is a fully caffeinated class file.

8. The method of claim 5, wherein the class file includes:
a plurality of bytecodes;
a first directory, wherein the directory points to the plurality of bytecode;
an element containing optimized content for the particular type of data processing system associated with the element; and
a second directory including a pointer that points to an element.

9. A method in a data processing system for processing class files, the method comprising the data processing system implemented steps of:
identifying a set of elements for use in a class file, wherein each element in the set of elements is associated with a particular type of data processing system, wherein the step of identifying comprises:
identifying a plurality of class files, wherein each class file is optimized for a particular data processing system; and
identifying elements within the class files, wherein a set of elements for use in a class file, wherein each element in the set of elements is associated with a particular type of data processing system;
receiving a request for the class file from a data processing system, wherein the data processing system has a type;
creating the class file based on the type of the data processing system requesting the class file; and
sending the class file to the data processing system.

10. A distributed data processing system for creating class files comprising:
receiving means for receiving a first data structure at a server, wherein the first data structure includes a plurality of bytecodes and optimized content;
identifying means for identifying a set of elements in the optimized content;
storing means for storing the set of elements; and
creating means, responsive to a request from a client, for creating a second data structure, wherein the second data structure includes the plurality of bytecodes and an element from the set of elements.

11. The data processing system of claim 10, wherein the first data structure further includes:
a first directory, wherein the directory points to the plurality of bytecodes; and
a second directory including a plurality of criteria associated with a plurality of pointers, wherein each pointer points to an element within the set of elements in the optimized content.

12. A distributed data processing system for creating class files comprising:
receiving means for receiving a first data structure at a server, wherein the first data structure includes a plurality of bytecodes and optimized content and wherein the first data structure is a fully caffeinated class file;
identifying means for identifying a set of elements in the optimized content;
storing means for storing the set of elements; and
creating means, responsive to a request from a client, for creating a second data structure, wherein the second data structure includes the plurality of bytecodes and an element from the set of elements.

13. A distributed data processing system for creating class files comprising:
receiving means for receiving a first data structure at a server, wherein the first data structure includes a plurality of bytecodes and optimized content;
identifying means for identifying a set of elements in the optimized content;
storing means for storing the set of elements; and
creating means, responsive to a request from a client, for creating a second data structure, wherein the second data structure includes the plurality of bytecodes and an element from the set of elements and wherein the second data structure is a fully caffeinated class file.

14. A data processing system for processing class files comprising:
identifying means for identifying a set of elements for use in a class file, wherein each element in the set of elements is associated with a particular type of data processing system;
receiving means for receiving a request for the class file from a client data processing system, wherein the client data processing system has a type;
creating means for creating the class file based on the type of the data processing system requesting the class file; and
sending means for sending the class file to the data processing system.

15. The data processing system of claim 14, wherein each element within the plurality of elements is optimized code for the particular type of data processing system associated with the element.

16. The data processing system of claim 14, wherein the class file is a fully caffeinated class file.

17. The data processing system of claim 14, wherein the class file includes:
a plurality of bytecodes;
a first directory, wherein the directory points to the plurality of bytecodes;
an element containing optimized content for the particular type of data processing system associated with the element; and
a second directory including a pointer that points to an element.

18. A data processing system for processing class files comprising:
identifying means for identifying a set of elements for use in a class file, wherein each element in the set of elements is associated with a particular type of data processing system, wherein the identifying means comprises:
first identifying means for identifying a plurality of class files, wherein each class file is optimized for a particular data processing system; and
second identifying means for identifying elements within the class files, wherein a set of elements for use in a class file, wherein each element in the set of elements is associated with a particular type of data processing system;
receiving means for receiving a request for the class file from a client data processing system, wherein the client data processing system has a type;
creating means for creating the class file based on the type of the data processing system requesting the class file; and
sending means for sending the class file to the data processing system.

19. A computer program product in a computer readable medium for creating class files, the computer readable medium comprising:
first instructions for receiving a first data structure at a server, wherein the first data structure includes a plurality of bytecodes and optimized content;

second instructions for identifying a set of elements in the optimized content;

third instructions for storing the set of elements; and fourth instructions, responsive to a request from a client, for creating a second data structure, wherein the second data structure includes the plurality of bytecodes and an element from the set of elements.

20. A computer program product in a computer readable medium for processing class files, the computer readable medium comprising:

first instructions for identifying a set of elements for use in a class file, wherein each element in the set of elements is associated with a particular type of data processing system;

second instructions for receiving a request for the class file from a data processing system, wherein the data processing system has a type;

third instructions for creating the class file based on the type of the data processing system requesting the class file; and fourth instructions for sending the class file to the data processing system.

* * * * *